Aug. 30, 1932.  C. F. HUNTOON  1,875,240
BRAKE BEAM SUPPORT
Filed Jan. 15, 1930   2 Sheets-Sheet 2
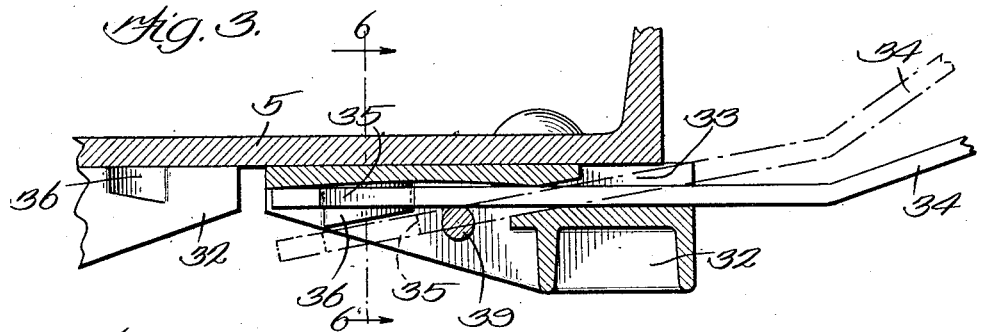
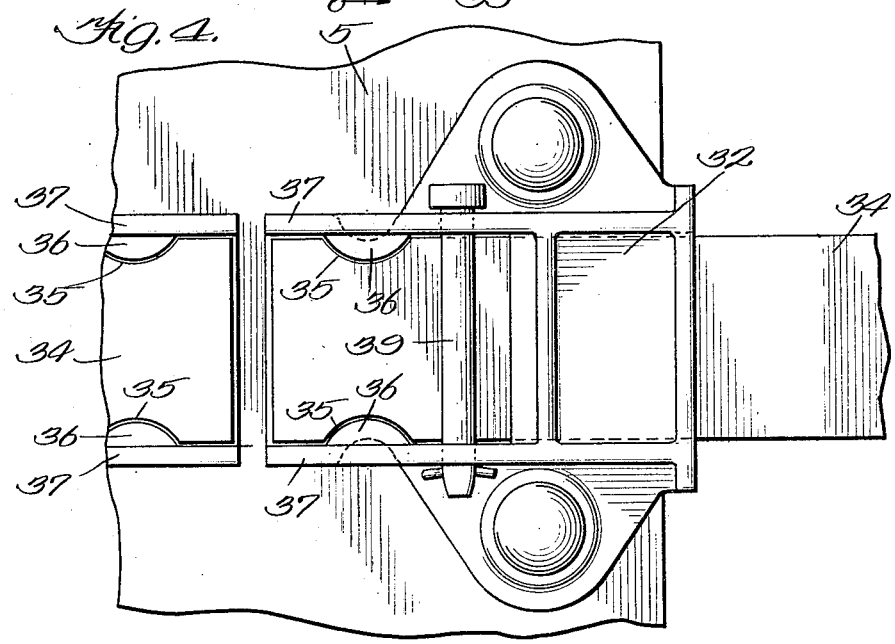
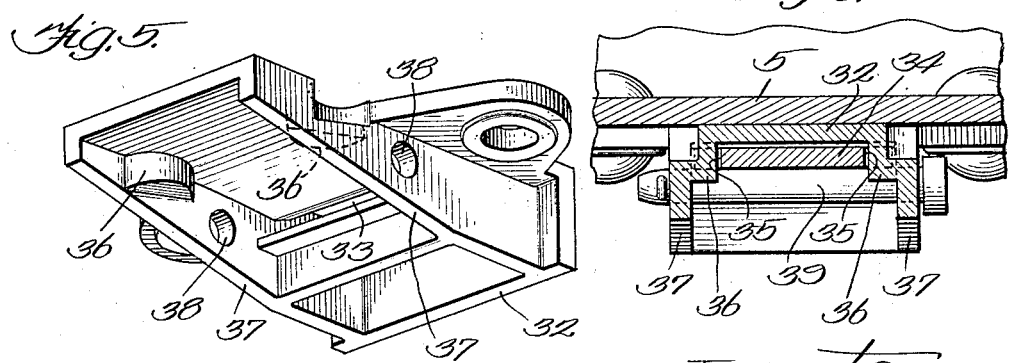
Inventor:
Charles F. Huntoon
By G. L. Cragg Atty.

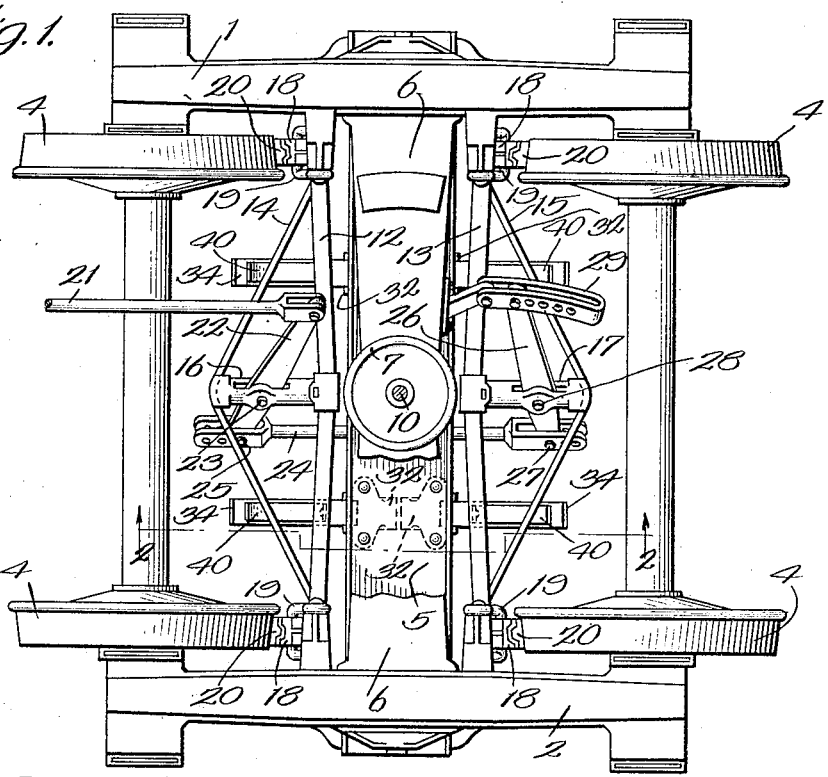

Patented Aug. 30, 1932

1,875,240

UNITED STATES PATENT OFFICE

CHARLES F. HUNTOON, OF SAN MARINO, CALIFORNIA

BRAKE BEAM SUPPORT

Application filed January 15, 1930. Serial No. 420,941.

My invention relates to brake gears for railway cars of the class employing brake shoe carrying brake beams and has for its object the provision of means for maintaining the brake beams level. These beams are usually arranged in pairs, there being a live lever for operating one of the brake beams of a pair, a dead lever for operating the other beam, and a connecting rod joining the lower ends of the brake levers. Each of these brake beams is inclusive of a compression member, a tension member and a strut interposed between intermediate portions of these members. The brake beams are suspended from links which are carried by the side frames of the truck to which the brake beams are supplied. The tendency is for the brake beams to sag at the ends of the struts which engage the tension members. The device of my invention prevents such sagging.

In carrying out my invention I employ a leveling bar in conjunction with each brake beam. This leveling bar is supported at an intermediate place upon and beneath the spring plank which overlies such bar. I provide interengaging holding formations upon and respectively fixed with relation to such leveling bar and the spring plank to maintain these two elements in engagement. In the preferred embodiment of the invention these holding formations are brought into engagement by turning the leveling bar upon its place of support and in a direction to place this bar in leveling relation with the brake beam. I desirably employ a bracket which is fixed upon and beneath the spring plank and which carries the holding formation that is provided upon the spring plank, and which also carries a pin which is engaged with the leveling bar to maintain engagement of the holding formations, this bracket having a throat accessible at the margin of the spring plank that is adjacent the brake beam and through which throat the leveling bar is passed into assembly with the spring plank, the bottom wall of the throat being in supporting relation to the leveling bar.

I will explain my invention more fully by reference to the accompanying drawings in which Fig. 1 is a plan view of a portion of one form of truck showing the preferred embodiment of the invention employed in connection therewith; Fig. 2 is a sectional view on line 2—2 of Fig. 1; Fig. 3 is a detail sectional view illustrative of the invention; Fig. 4 is a bottom view of the structure shown in Fig. 3; Fig. 5 is a perspective view of one element of the invention; and Fig. 6 is a sectional view on line 6—6 of Fig. 3.

The truck is equipped with side frames 1, 2 of any suitable construction, which carry bearings that receive the ends of the axles 3 for the car wheels 4 that thus carry the side frames. The spring plank 5 is carried upon the lower portions of the side frames and carries suitable spring mechanism, not shown, which supports the truck bolster 6. This bolster is provided with the female member 7 of the center bearing which receives the male center bearing member 8 that is provided upon the bottom of the body bolster 9. A king pin 10 depends from the center bearing member 8 and passes through the center bearing member 7 and the portion of the truck bolster below this latter member. A portion 11 of a car body is shown upon the body bolster.

Each brake beam illustrated is inclusive of two cambered compression members 12 and 13 located between the axles, two rods 14 and 15, respectively connected with the ends of said members 12 and 13 and constituting truss tension members, and two struts 16 and 17 respectively interposed between mid-portions of the compression and tension members of the beams. The truck bolster and spring plank are between the beams. A brake head 18 is secured upon each end of each of the brake beams. Brake hangers in the form of links 19 depend from the upper portions of the side frames and carry the brake beams in the region of the compression members 12, 13, said hangers being suitably received, at their lower ends, in notches provided in the brake heads. Brakes in the form of shoes 20 are carried upon the brake heads in a position to be applied to the car wheels when the trussed brake beams are moved toward the wheels.

The brake actuating and releasing rod 21 is connected with the upper end of the live brake lever 22 which is pivotally connected between its ends at 23 with the strut 16 through which this lever desirably passes. The lower end of this lever is pivotally connected, at a selected place, with one end of the connecting rod 24, as indicated at 25. The other end of this connecting rod is similarly connected with the lower end of the dead brake lever 26, as indicated at 27. The lever 26 is pivotally connected, between its ends, with the strut 17, as indicated at 28. The upper end of the dead lever 26 is connected at a selected place with the dead lever guide or stop 29, as indicated at 30, this guide or stop being pivotally connected, at its inner end, with the bracket 31 which is carried by the truck bolster. The brake beam having the member 12 is directly controlled by the live lever 22 and strut 16 which indirectly control the movement of the brake beam having the member 13 through the intermediation of the connecting rod 24, the dead lever 26 and strut 17. Brackets 32 are fixed upon and beneath the spring plank. There are desirably two such brackets on each longitudinal side of the spring plank about half way between the middle and the ends of the brake beam, each beam having two such brackets individual thereto. Each bracket has a throat 33 which is accessible at the margin of the spring plank that is adjacent the corresponding brake beam. Each bracket is in supporting relation to a leveling bar 34 which is passed through the throat 33 of such bracket until the inner end of the bar is in position to have its holding formations 35 engaged with the holding formations 36 upon the bracket, this engagement being effected by the upward movement of the inner end of the leveling bar when the complemental holding formations 35 and 36 are brought into register. The holding formations 35 are desirably produced by notching the sides of the corresponding leveling bar and the holding formations 36 are in the form of lugs which are free of attachment at their bottom faces to permit of the interengagement of the complemental holding formations. In the preferred embodiment of the invention each throat passage 33 is widened at its outer portion to permit depression of the inner end of the leveling bar and the elevation of the outer end of the bar as the inner bar end is being adjusted to bring the holding formation thereon into position to be engaged with the holding formation upon the bracket following the depression of the outer end of the bar into brake beam leveling position. The bottom wall of the throat supports the leveling bar that is turned thereon into position. Each bracket desirably has depending side walls 37 between which the inner end of the corresponding leveling bar is received. These depending side walls are provided with apertures 38 located just below the normal level of the inner end of the corresponding leveling bar. A headed retaining pin 39 is passed through each pair of apertures 38 to maintain the corresponding leveling bar and bracket in assembly. The leveling bars are desirably in the form of slightly resilient plates. In order that these bars or plates may have desired supporting relation with the brake beams, I provide such beams with arms 40 which are also desirably in the form of slightly resilient plates. The unattached ends of these arms underlie the tension members of the brake beams and are engaged with the same by the leveling bars when these bars are in position, these bars being beneath said arms.

Changes may be made without departing from the invention.

Having thus described my invention, I claim:

1. In a brake beam support, the combination with a brake beam; of a resilient element fixed thereto and extending forwardly thereof; a spring plank; a bracket fixed upon and beneath the spring plank, said bracket having a throat accessible at the margin of the spring plank; a resilient levelling bar adapted to be passed through said throat into assembly with the spring plank, the bottom wall of the throat being in supporting relation to the leveling bar and the throat passage being widened at its outer portion to permit depression of the inner end of the leveling bar and elevation of the outer end of the bar; and holding formations on said bracket and said bar adapted to be brought into engagement upon depression first of the inner and then of the outer ends of the bar, said bar being adapted upon depression of its outer end to engage said resilient element for yieldingly supporting the brake beam.

2. In a brake beam support, the combination with a mounting; of a bracket fixed upon and beneath the mounting, said bracket having a throat accessible at the margin of the mounting; a leveling bar adapted to be passed through said throat into assembly with the mounting, the bottom wall of the throat being in supporting relation to the leveling bar and the throat passage being widened at its outer portion to permit depression of the inner end of the leveling bar and elevation of the outer end of the bar; and holding formations on said bracket and said bar adapted to be brought into engagement upon depression first of the inner and then of the outer ends of the bar.

3. In a brake beam support, the combination with a mounting; of a bracket fixed upon and beneath the mounting, said bracket having a throat accessible at the margin of the mounting; a leveling bar adapted to be passed through said throat into assembly with the mounting, the bottom wall of the throat being in supporting relation to the leveling bar and the throat passage being widened at its outer portion to permit depression of the inner end of the leveling bar and elevation of the outer end of the bar; and holding formations on said bracket and said bar adapted to be brought into engagement upon depression first of the inner and then of the outer ends of the bar, said holding formations including notches in the sides of the leveling bar.

4. In a brake beam support, the combination with a mounting; of a bracket fixed upon and beneath the mounting, said bracket having a throat accessible at the margin of the mounting; a leveling bar adapted to be passed through said throat into assembly with the mounting, the bottom wall of the throat being in supporting relation to the leveling bar and the throat passage being widened at its outer portion to permit depression of the inner end of the leveling bar and elevation of the outer end of the bar; holding formations on said bracket and said bar adapted to be brought into engagement upon depression first of the inner and then of the outer ends of the bar, said holding formations including notches in the sides of the leveling bar; and a pin adapted to be passed through the bracket and beneath the inner end of the leveling bar, to maintain the parts in assembly.

5. In a brake beam support, the combination with a brake beam; of a resilient element fixed thereto and extending forwardly thereof; and a resilient member underlying the brake beam and engaging said resilient element for yieldingly supporting said brake beam.

6. In a brake beam support, the combination of a bracket; a throat in said bracket; a lug in said throat; a bar adapted for longitudinal and angular movement in said throat, the bar being snugly received in said throat; a notch in said bar adapted to engage said lug to lock said bar against longitudinal movement; and means pressing upon the bar at its end opposite said notch with a wall of the throat as a fulcrum for springing the bar into engagement with said lug.

In witness whereof, I hereunto subscribe my name.

CHARLES F. HUNTOON.